United States Patent [19]

Kiesow

[11] Patent Number: 5,710,642
[45] Date of Patent: Jan. 20, 1998

[54] MULTI-FORMAT FILM SCANNER DEVICE

[75] Inventor: Ronald Herbert Kiesow, Spencerport, N.Y.

[73] Assignee: Eastman Kodak Company, Rochester, N.Y.

[21] Appl. No.: 667,160

[22] Filed: Jun. 20, 1996

[51] Int. Cl.$^6$ .............................. H04N 1/04; H04N 1/46
[52] U.S. Cl. ........................ 358/474; 358/487; 358/488; 358/4.93; 358/496; 358/498; 358/506; 396/328; 396/446
[58] Field of Search ...................... 358/486, 487, 358/488, 496, 498, 493, 506; 348/97, 98, 96; 242/324; 399/151; 396/322, 328, 387, 446; 352/79, 80

[56] References Cited

U.S. PATENT DOCUMENTS

| | | | |
|---|---|---|---|
| 3,528,732 | 9/1970 | Procop | 242/324 |
| 4,807,039 | 2/1989 | Fenton | 358/487 |
| 5,088,813 | 2/1992 | Wakefield | 352/183 |
| 5,146,341 | 9/1992 | Erck et al. | 358/214 |
| 5,153,733 | 10/1992 | Fetterman et al. | 358/498 |
| 5,218,463 | 6/1993 | Lianza et al. | 358/487 |
| 5,386,267 | 1/1995 | Jones | 358/484 |

*Primary Examiner*—Edward L. Coles, Sr.
*Assistant Examiner*—Mark Wallerson
*Attorney, Agent, or Firm*—Gordon M. Stewart

[57] ABSTRACT

A multi-format scanner, has first and second laterally spaced film gates which are dimensioned to accomodate film of respective different widths lengthwise therethrough for scanning. Each gate has an aperture through which light can pass. A light source illuminates film at the aperture of at least a selected one of the gates. A sensor receives light from the light source which has passed through film at the aperture of the selected gate. A film input and output track set is aligned with the selected gate to lengthwise convey elongated film of either width, into and out of the selected gate. A drive moves the film lengthwise through the selected gate. At least one of: the film gates, the sensor or track set, can be laterally moved so that either gate can serve as the selected gate.

9 Claims, 5 Drawing Sheets

MULTI-FORMAT FILM SCANNER DEVICE

FIELD OF THE INVENTION

The invention relates generally to the field of film scanning, and in particular to a device which allows scanning of multiple film formats.

BACKGROUND OF THE INVENTION

Scanners are used to convert hard copy analog images into digital data. The use of scanners has become widespread for a variety of applications, including storing, manipulating, transmitting and displaying or printing copies of images. For example, images captured in photographic media are being converted to digital data and stored on compact or magnetic discs for readout and display as a video image, or for printing with various types of color printers. In order to capture the photographic image digitally, the image frame is scanned with a light beam or line, and the light transmitted through the image is detected, typically as three primary color light intensity signals, and digitized. The digitized values may be formatted to a standard for video display and stored on compact disc or magnetic media. Such film digitizers take a variety of forms and the various common aspects of film digitizing, particularly line illumination and linear CCD-based digitizers, are described in greater detail in, for example, U.S. Pat. No. 5,012,346.

One particularly useful film scanner is described in U.S. Pat. No. 5,146,341. The scanner of that patent uses a pair of rotating capstans (or discs) which together with a pair of abutting belts, engage only the edges of a film to be scanned while maintaining it flat. Light can then pass between the discs, through the film, and toward a sensor. However, this scanner like other film scanners, was designed to accommodate only one film format (that is, one film width), namely the common 35 mm film. However, the recent advent of the new Advanced Photo System (APS) film, which is a film of narrower width than 35 mm, has made it necessary to alter scanner construction to accomodate such a film. This will typically require altering many components of the scanner to be used. For example, in the case of the scanner described in U.S. Pat. No. 5,146,341, a new film gate has to be constructed with different disc and belt spacings.

It would be desirable then to provide a film scanner which can accommodate film of different widths for scanning, without having to reconstruct or alter scanner components, and which can relatively rapidly switch from scanning one film width to another.

SUMMARY OF THE INVENTION

The present invention then, provides a multi-format film scanner (that is, a film scanner which can accomodate film of different widths), comprising:

a) first and second laterally spaced film gates which are dimensioned to accomodate film of respective different widths lengthwise therethrough for scanning, each gate having an aperture through which light can pass;

b) a light source to illuminate film at the aperture of at least a selected one of the gates;

c) a sensor to receive light from the light source which has passed through film at the aperture of the selected gate;

d) a film input and output track set aligned with the selected gate to lengthwise convey elongated film of either width, into and out of the selected gate;

e) drive means to move the film lengthwise through the selected gate; and f) means for laterally moving at least one of: the film gates, the sensor or track set, such that either gate can serve as the selected gate.

Preferably, the means for laterally moving moves the gates laterally so that either one can serve as the selected gate.

A film scanner of the present invention then, can accomodate film of different widths for scanning, without having to alter or interchange scanner components such as nests, belts, integration boxes or film track sets. A scanner of the present invention allows relatively rapidly switching from scanning one film width to another. Particular film scanners of the present invention also maintain film flatness during the scanning operation.

BRIEF DESCRIPTION OF THE DRAWINGS

To facilitate understanding, identical reference numerals have been used, where possible, to designate identical elements that are common to the figures.

EMBODIMENTS OF THE INVENTION

It will be appreciated that a film "gate" is simply a component of the scanner which by itself, or together with other scanner components, can retain film of a corresponding width in a position during scanning such that light from a light source can be modulated by an image on the film, and received by a sensor. A film gate also allows the film to be moved lengthwise past that position as required to complete scanning or allow the film to be advanced to a next frame in the gate for scanning.

Figure 1:
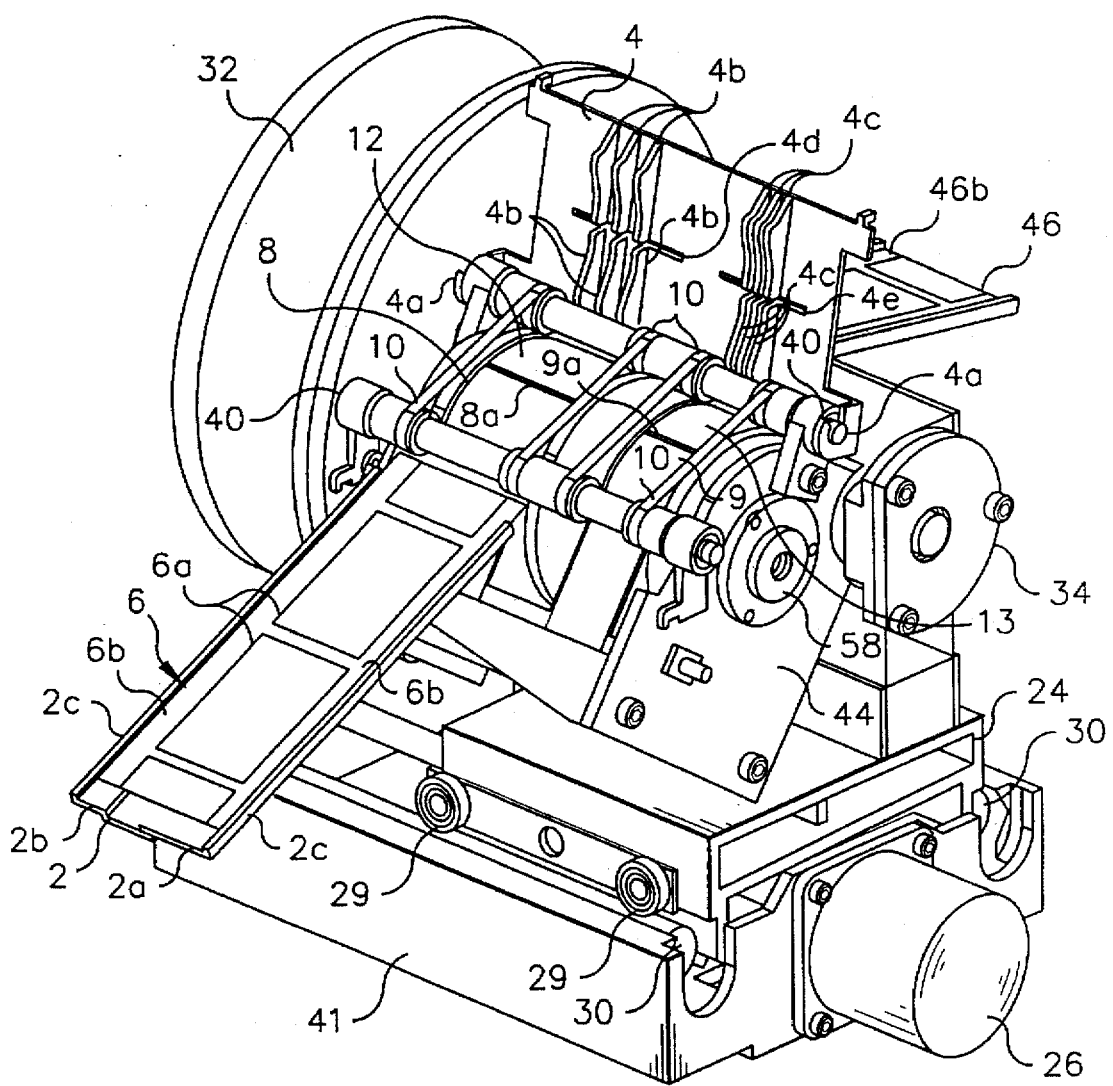
FIG. 1 is an isometric view of a multi-format scanner of the present invention, shown from the input, or load, side.
Figure 2:
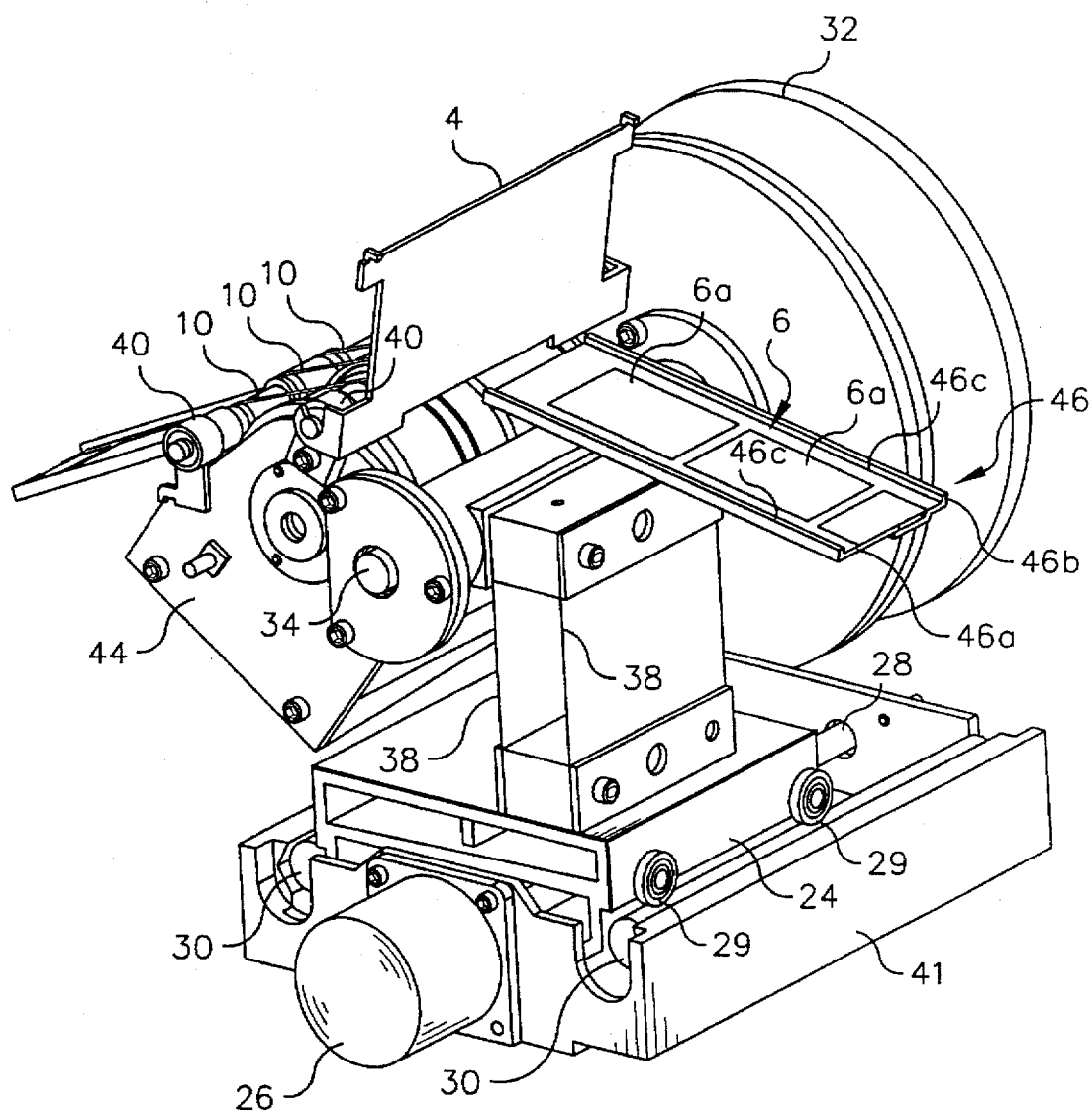
FIG. 2 is a isometric view of the scanner of FIG. 1 from the unload, or output, side.
Figure 3:
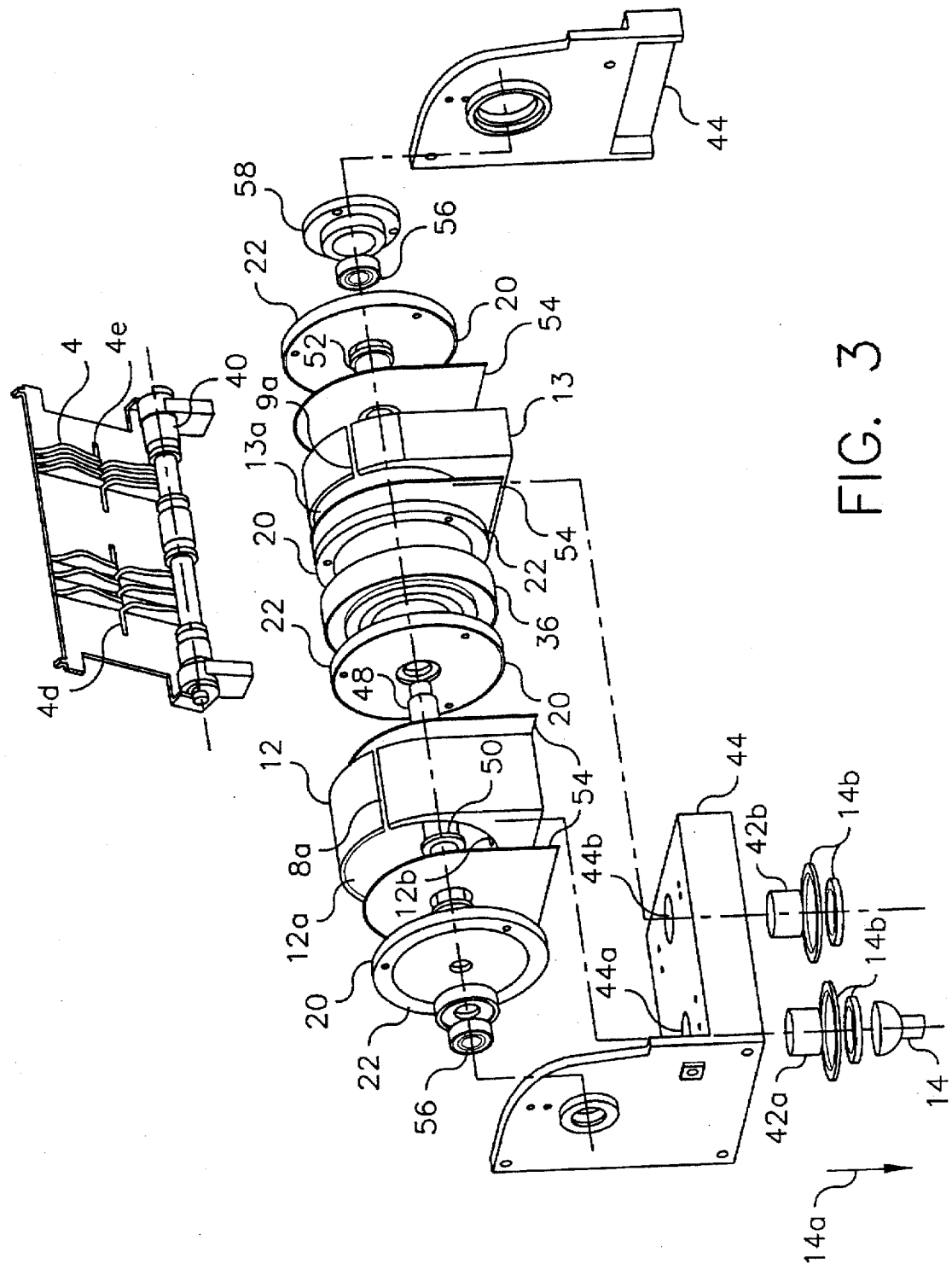
FIG. 3 is an exploded view of most of the components of the scanner of FIG. 1.
Figure 4:
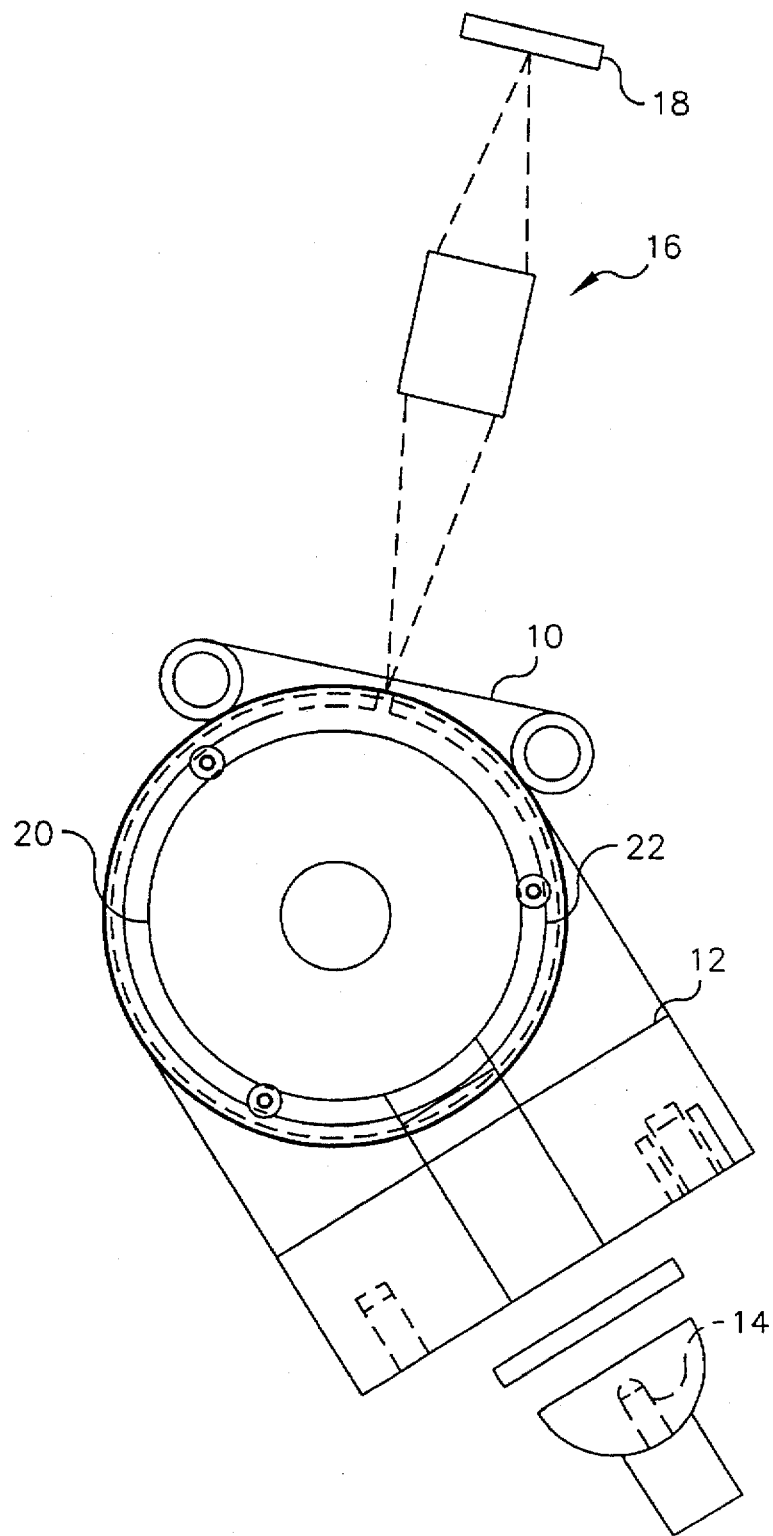
FIG. 4 is a side view of some of the components of the scanner of FIG. 1.

Referring now to FIGS. 1–4, the scanner shown has laterally spaced first and second film gates 8, 9 respectively. Each gate 8, 9 includes an aperture in the form of a laterally extending slit 8a, 9a respectively. Each gate 8, 9 includes a pair of laterally spaced disks 20, each disk 20 having a raised periphery 22. The four disks 20 and a wheel 36 are mounted on a drive shaft 48 for rotation with drive shaft 48. Bearings 56 rotatably support drive shaft 48 at either end. One of the bearings 56 is mounted directly on a main housing 44 while the other one is mounted on an opposite end of main housing 44 through a bearing cap 58, as best seen in FIG. 3. It will be seen that the pair of disks 20 of film gate 8 are laterally spaced apart (that is, they are spaced apart in the axial direction of the disks) a greater distance than the pair of disks 20 of gate 9. This is because gate 8 is intended to accomodate a film of greater width (such as conventional 35 mm film) than that which is intended to be accommodated by gate 9 (in which disks 20 are preferably spaced apart to accomodate an APS film).

Each film gate 8, 9 additionally includes a light integrating chamber 12 and 13, respectively. Gaskets 54 are provided to prevent light leakage laterally from the integrating chambers 12, 13. Integraing chambers 12, 13 may include a reflecting inside surface, 12a, 13a, respectively, in a manner well known for integrating chambers. Integrating chambers 12, 13 further include reflective hollow baffles 50, 52 respectively, which are supported on drive shaft 48. The width of integrating chambers 12, 13 and the lengths of baffles 50, 52 are different since they correspond to the lateral spacing of disks 20 for their respective gates 8, 9. Light can enter integrating chambers 12, 13 through respective light inlet openings 12b, 13b. Only one of those openings, opening 12b, is visible in FIG. 3, although it will be understood that there is a similar opening 13b for integrating chamber 13.

A rotatably mounted elongated capstan 34 is urged into an abutting relationship with wheel 36 by virtue of two sheet metal flexures 38 which are mounted on a translator base 24 (described below). Capstan 34 is in turn rotatably driven by an electric motor 32. Thus, actuation of motor 32 causes capstan 34 to rotate. The engagement of the capstan 34 with the drum wheel 36 translates rotary motion to the rotatable disks 20.

A pair of laterally spaced belts 10 abut the peripheries of respective disks 20 of each gate 8, 9, and are rotatably retained in position by two parallel rotatably mounted guide shafts 40. Belts 10 can have ridges running along their inside lengths and are retained in position by corresponding grooves (not shown) in shafts 40 as well as by raised peripheries 22 of disks 20. It will be appreciated that because of the foregoing abutting relationship of belts 10 and disks 20, rotation of disks 20 causes belts 10 to also rotate.

A means for laterally moving gates 8, 9 and their associated belts 10, shafts 40 and wheel 36, which together can be considered components of a scanning station, is provided by mounting the scanning station on the translator base 24. Translator base 24 is moveable by virtue of four bearings 29 riding on two parallel guide rails 30, which are mounted within a base 41. Translator base 24 can be moved laterally by the rotational motion of a lead screw 28 driven by a stepper motor 26.

A film input and output track set includes an input track 2 and an output track 46. Tracks 2 and 46 are held in position by supports (not shown) in the scanner. Input track 2 includes a bottom surface 2a and two opposed raised side edges 2c. One elongated side 2b of track 2 is moveable laterally so that the distance between side edges 2c can be varied to accomodate the width of the film to be scanned. Output track 46 similarly has a bottom surface 46a, two opposed raised side edges 46c, and an elongated side 46b which is laterally moveable to alter the distance between side edges 46c. The track set is aligned such that input track 2 can guide an elongated film 6 into the gate with which the track set is aligned (that is, the "selected gate"; gate 8 being the selected gate as shown in the drawings), while output track 46 guides film 6 out of the selected gate. The spacing of raised edges 2c and 46c will be adjusted to closely match the spacing of disks 20 of the gate 8 or 9 with which the track set is aligned at any given time.

The scanner shown also includes a cover plate 4. Cover plate 4 includes two sets of ribs 4b spaced about a slit 4d, and two sets of ribs 4c spaced about another slit 4e. Cover plate 4 is pivotable about an axis through positions 4a, from an open position shown in the drawings, to a closed position. When cover plate 4 is in the closed position, it lies over the scanning area (defined by slits 8a, 9a) of both gates 8, 9 simultaneously. While in the closed position, ribs 4b and 4c are spaced by a predetermined gap from a film which might be moving through a gate, in order to inhibit any unduly large movement of an image area of the film (that is, such as an image area 6a which is area between edge margins of the film and which carries the photographic image) away from disks 20. Simultaneously, slits 4d and 4e lie in alignment above slits 8a and 9a.

Main housing 44 includes two openings 44a and 44b which are aligned with openings 12b, 13b respectively. Openings 44a, 44b carry within them respective light pipes 42a, 42b. An electric light source 14 is shown in alignment with opening 44a. However, light source 14 is mounted by means of a retractable mount (not shown) such that it can be moved transversely away from gates 8, 9 (that is, in the direction of arrow 14a) during lateral movement of gates 8, 9. Following completion of such lateral movement, light source 14 can then be transversely moved back to a position adjacent whichever light pipe 42a, 42b it is in axial alignment with. Gaskets 14b help reduce light leakage.

A sensor 18, such as well known CCD line or array sensors, is positioned in optical alignment with the slit 8a or 9a of the selected gate (again, the drawings showing gate 8 as the selected gate). Thus sensor 18 will receive light from light source 14 which has passed through film, such as film 6, at the aperture of the selected gate, and which has passed through a lens assembly 16. Lens assembly 16 may be any known system which can be used with sensor 18.

The operation of the multi-format scanner described above will now be further described. In particular, when a particular film format is selected (for example, 35 mm or APS film), stepper motor 26 will be activated as required to cause translator base 24 to move in a lateral direction until gate 8 or 9 corresponding to the selected film format, is in longitudinal alignment with input track 2 and output track 46. The gate so aligned becomes the selected gate. Gate 8 is shown as the selected gate, although as will be appreciated from the drawings, translation of base 24 (to the left in FIG. 1) can cause gate 9 to become the selected gate. Gate 8 can be later selected again by reversing stepper motor 26. Also, at this time the sections 2c and 46c have their widths adjusted to accomodate the selected film format. This can be accomplished by a solenoid, motor or some other means. Cover plate 4 will be positioned in its normally closed position.

Prior to film 6 entering the selected gate 8 or 9, the capstan drive motor 32 is actuated causing the capstan 34 to rotate. The engagement of the capstan 34 with the film drum wheel 36 causes disks 20 to rotate. The capstan 34 is kept in engagement with the capstan drive wheel 36 by flexures 38, previously described. Flexures 38 are loaded at a predetermined force which causes a uniform force against the drive wheel 36 by capstan 34, ensuring a constant and smooth rotation while transporting the film thru the scanning gates.

Lengthwise movement of film through the selected gate 8 or 9 is accomplished by the rotational motion of disks 20 and the abutting drive belts 10. Disks 20, belts 10, motor 32 and the associated drive mechanism serves as a drive means to move the film lengthwise through the selected gate, and in particular lengthwise past the slit 8a or 9a of the selected gate. In particular, edges of the film, such as edges 6b of film 6, are pinched between disks 20 and belts 10. It will be realized however, that other drive means are possible. For example, in a less preferred arrangement belts 10 might be arranged to be directly driven by a motor with disks 20 being driven through the driven belts 10.

During such lengthwise movement the positions of the ribs 4b or 4c on the closed cover plate, inhibits upward motion of the film in a direction toward the sensor 18. This is useful in maintaining the images of the film in focus during scanning.

During scanning of the film, with gate 8 as the selected gate, light source 14 is illuminated and light is transmitted through light pipe 42a, into integration chamber 12, out slit 8a and aligned slit 4d, through the image area of the film, and then through lens assembly 16 to sensor 18. The image signal received by sensor 18 is converted into a digital image signal corresponding to each image area scanned, by suitable electronic circuitry (not shown). Film which has been scanned exits the selected film gate by output track 46.

When it is desired to change the selected scanning gate in order to scan film of the other format format, light source 14 is moved transversely away from scanner main housing 44 during lateral movement of gates 8, 9 and main housing 44, as already described. translation period. When lateral movement is complete, light source 14 is transversely moved into alignment with the light pipe 42a or 42b corresponding to the selected film gate 8 or 9. When gate 9 is the selected gate, light is transmitted through light pipe 42b, into integration chamber 13, out slit 9a and aligned slit 4e, through the image area of the film, and then through lens assembly 16 to sensor 18. Should film become jammed in the selected gate 8 or 9, cover plate 4 can be pivoted to its open position for easy access to components beneath it.

Figure 5:
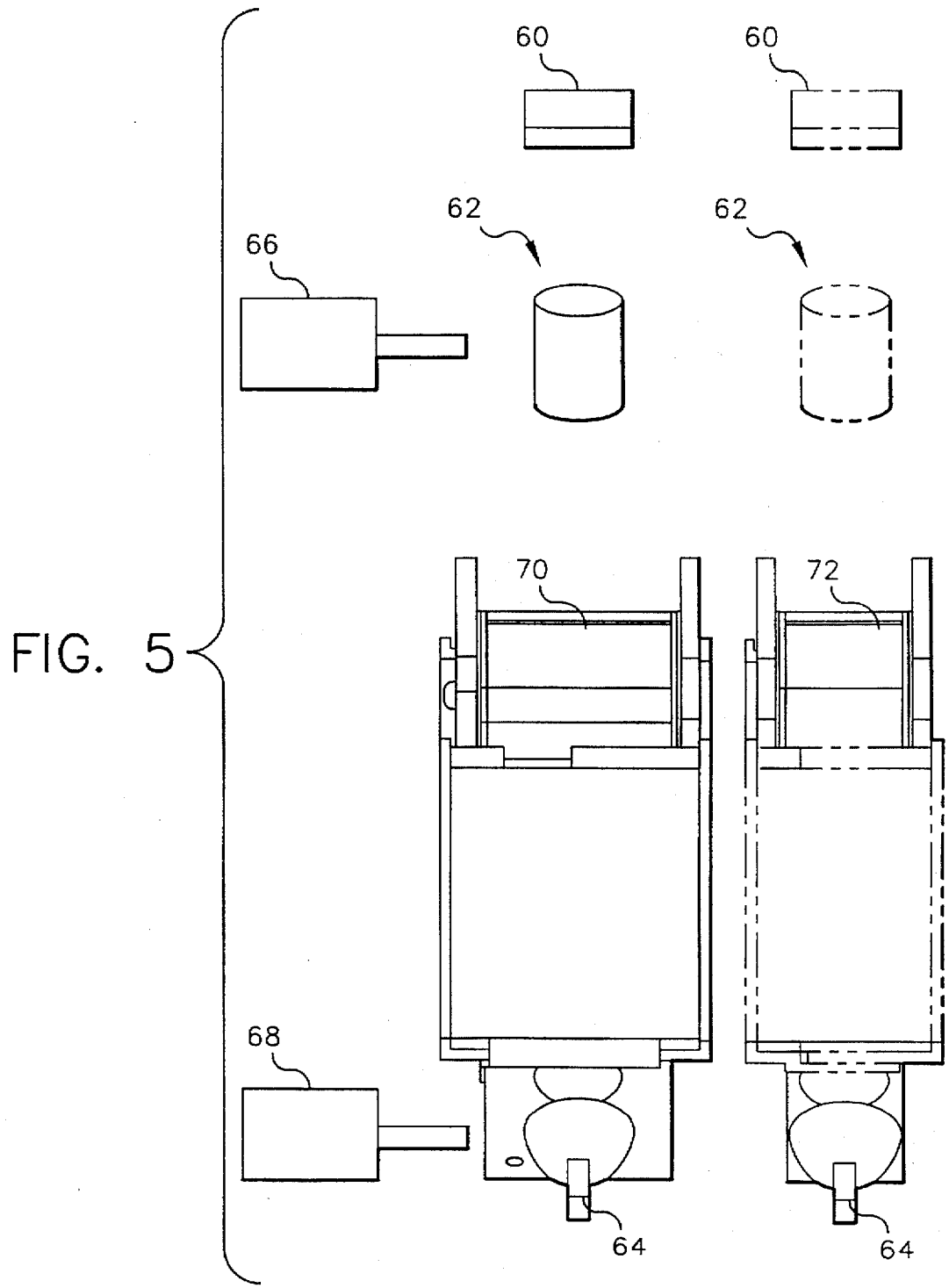
FIG. 5 is a side view of some components of an alternative scanner of the present invention.

The alternative embodiment of a scanner of the present invention shown in FIG. 5 is constructed similarly to that of FIGS. 1–4. Two gates 70, 72 are provided which are essentially the same as gates 8, 9 respectively of FIGS. 1–4. Similarly belts such as belts 10, and a suitable drive means, all as described in connection with FIGS. 1–4 can also be provided (none of these being shown in FIG. 5 for clarity).

However, in the embodiment of FIG. 5 the scanning stations and film gates 70 and 72 remain stationary even when it is desired to change the selected gate. Instead, the sensor 60 and lens assembly 62 are translated to a position in optical alignment with the selected gate by actuation of a device 66 (solenoid or motor). Similarly, a light source 64 is also moved to the desired position in a similar manner using a device 68 (also a selenoid or motor). Movement of light source 64 may or may not occur simultaneously with the lens/sensor movement. An input and output track set can be provided (not shown in FIG. 5) comprised of input and output tracks similar to the input track 2 and output track 46 in FIGS. 1–4. These can also be moved by a suitable actuating means (not shown) into a position aligned with the selected gate. Alternatively, a fixed input and output track can be positioned in alignment for each gate, it being necessary then for an operator to place the film to be scanned in the correct input track corresponding to the film width. It will be appreciated that in the embodiment of FIGS. 1–4 less components need to be moved when a different film format is to be scanned.

The invention has been described with reference to a preferred embodiment. However, it will be appreciated that variations and modifications can be effected by a person of ordinary skill in the art without departing from the scope of the invention.

PARTS LIST

6a Image Area
6b Edges
8, 9 Gates
8a, 9a Slits
10 Belts
12 and 13 Chambers
12a, 13a Inside Surface,
12b, 13b Openings
14 Light Source
14a Arrow
14b Gaskets
16 Lens Assembly
18 Sensor
20 Disks
22 Peripheries
24 Base
26 Stepper Motor
28 Screw
30 Guide Rails
32 Motor
34 Capstan
36 Wheel
38 Flexures
40 Shafts
41 Base
44 Housing
42a, 42b Pipes
44a and 44b Openings
46a Bottom Surface
46b Elongated Side
48 Drive Shaft
50, 52 Baffles
54 Gaskets
56 Bearings
58 Bearing Cap
60 Sensor
62 Lens Assembly
64 Light Source
66 Device
68 Device
70, 72 Gates

I claim:
1. A multi-format scanner, comprising:
 a) first and second laterally spaced film gates which are dimensioned to accomodate film of respective different widths lengthwise therethrough for scanning, each gate having an aperture through which light can pass;
 b) a light source to illuminate film at the aperture of at least a selected one of the gates;
 c) a sensor to receive light from the light source which has passed through film at the aperture of the selected gate;
 d) a film input and output track set aligned with the selected gate to lengthwise convey elongated film of either width, into and out of the selected gate;
 e) drive means to move the film lengthwise through the selected gate;
 f) means for laterally moving at least one of: the film gates, the sensor or track set, such that either gate can serve as the selected gate.

2. A multi-format scanner, comprising:
 a) first and second laterally spaced film gates which are dimensioned to accomodate film of respective different widths lengthwise therethrough for scanning, each gate having an aperture through which light can pass;
 b) means for laterally moving at least one of the film gates so that either gate can be laterally positioned to serve as a selected gate;

c) a light source to illuminate film at the aperture of at least a selected one of the gates;

d) a sensor to receive light from the light source which has passed through film at the aperture of the selected gate;

e) a film input and output track set aligned with the selected gate to lengthwise convey elongated film of either width, into and out of the selected gate; and f) drive means to move the film lengthwise through the selected gate.

3. A multi-format scanner according to claim 2 wherein the light source comprises a single light source which does not move in the direction of lateral movement of the film gates, positioned to be in alignment with the selected film gate.

4. A multi-format scanner according to claim 3 wherein the light source moves transversely away from the gates during lateral movement of the gates.

5. A multi-format scanner according to claim 1 wherein:

each gate comprises a pair of laterally spaced rotatable disks;

the drive means comprises a pair of laterally spaced belts for each gate, each belt pair abutting respective disks of a corresponding gate;

the disk and belt pairs for one gate have a different lateral spacing than the disk and belt pairs of the other gate, so that edges of the different width films can be driven lengthwise between the disks and belts of respective gates; and motor means for rotatably driving the disks and belts.

6. A multi-format scanner according to claim 5 wherein each film gate includes a light integrating cavity positioned between the disk and belt pair of each drive means, and wherein the aperture of each gate is a laterally extending slit and each light integrating cavity directs light from the light source to the slit of the corresponding gate when that gate is the selected gate.

7. A multi-format scanner according to claim 1 additionally comprising a cover plate which during scanning of a film, is positioned adjacent an image area of the film to inhibit movement in a direction toward the sensor.

8. A multi-format scanner according to claim 7 wherein the cover plate can be positioned adjacent a scanning area of both gates simultaneously, and moves laterally with the gates.

9. A multi-format scanner according to claim 7 wherein the cover plate is moveable between a closed position for scanning and an open position in which it is spaced apart from the scanning area of the gates.

* * * * *